US012613405B1

(12) United States Patent　　　　　(10) Patent No.:　US 12,613,405 B1
Jiao　　　　　　　　　　　　　　　　　　(45) Date of Patent:　　Apr. 28, 2026

(54) PARALLEL-DRIVEN BINOCULAR ANTI-SHAKE ASSEMBLY

(71) Applicant: Chengdu Dinxin Precision Control Tech Co., Ltd., Chengdu (CN)

(72) Inventor: Zhitao Jiao, Chengdu (CN)

(73) Assignee: Chengdu Dinxin Precision Control Tech Co., Ltd., Chengdu (CN)

( * ) Notice: Subject to any disclaimer, the term of this patent is extended or adjusted under 35 U.S.C. 154(b) by 0 days.

(21) Appl. No.: 19/317,250

(22) Filed: Sep. 3, 2025

(30) Foreign Application Priority Data

Jul. 23, 2025　(CN) .......................... 202521549426.2

(51) Int. Cl.
　　*G02B 23/18*　　　(2006.01)
　　*G02B 7/06*　　　(2021.01)
　　*G02B 7/18*　　　(2021.01)
　　*G02B 27/64*　　(2006.01)
(52) U.S. Cl.
　　CPC .............. *G02B 23/18* (2013.01); *G02B 7/06* (2013.01); *G02B 7/1805* (2013.01); *G02B 27/646* (2013.01)
(58) Field of Classification Search
　　None
　　See application file for complete search history.

(56) References Cited

U.S. PATENT DOCUMENTS

| | | | | |
|---|---|---|---|---|
| 5,798,863 | A * | 8/1998 | Udagawa ............. | G02B 27/646 359/557 |
| 7,675,678 | B2 * | 3/2010 | Woker ..................... | G02B 7/12 359/407 |
| 12,399,378 | B1 * | 8/2025 | Jiao ......................... | G02B 23/02 |
| 2004/0046953 | A1 * | 3/2004 | Nagata ................... | G02B 7/005 356/4.01 |
| 2014/0320962 | A1 * | 10/2014 | Ando ................... | G02B 27/646 359/557 |
| 2015/0219920 | A1 * | 8/2015 | Ando ..................... | G02B 23/18 359/557 |
| 2017/0075131 | A1 * | 3/2017 | Kaya ..................... | G02B 23/02 |

* cited by examiner

*Primary Examiner* — Derek S. Chapel
(74) *Attorney, Agent, or Firm* — Hemisphere Law, PLLC

(57)　　　　　　　ABSTRACT

A parallel-driven binocular anti-shake assembly relates to the field of optical image stabilization technologies, including: symmetrically arranged left and right prism housings mounted in a rotation frame via rotating shaft bearings; a bridging connecting rod with two ends connected to the prism housings via bearings, thereby driving synchronous rotation of the two prism housings about their respective rotating shafts; left and right side walls of the rotation frame hinged to the outer frame via side bearings; an integrated circuit board integrating an inner shaft driving coil, an outer shaft driving coil, an inner shaft Hall element, an outer shaft Hall element, and a gyroscopic sensor; an inner shaft driving magnetic steel disposed at the middle of the connecting rod; an inner shaft sensing magnetic steel disposed on a sidewall of either the left or right prism housing; and an outer shaft magnetic steel disposed on the outer frame.

10 Claims, 5 Drawing Sheets

PARALLEL-DRIVEN BINOCULAR ANTI-SHAKE ASSEMBLY

TECHNICAL FIELD

The disclosure relates to the field of optical image stabilization technologies, and is particularly applicable to devices such as binocular telescopes that require dual-optical-path synchronous anti-shake, and more particularly to a binocular anti-shake assembly that achieves synchronous movement of two prisms through a parallel-link mechanism and employs individual-axis control strategies for parallel driving.

BACKGROUND

In modern precision optical instruments, particularly in high-accuracy devices such as telescopes, anti-shake technology constitutes a critical means of enhancing observational stability and precision. While advances in science and technology have progressively advanced both research into and deployment of anti-shake systems, the vast majority of contemporary anti-shake techniques continue to exhibit shortcomings, particularly in terms of anti-shake efficacy, hardware complexity, and overall system robustness.

Anti-shake telescopes in the related art generally employ intricate gyroscope sensors that are fixedly connected to prisms or lenses. This approach necessitates multiple printed circuit boards (PCBs) for interconnection, which not only increases system complexity but also affects reliability and stability of the system to a certain extent. Moreover, the transmission mechanisms of conventional anti-shake telescopes typically rely on screw-fixation method to ensure transmission accuracy; which is difficult to improve transmission accuracy while streamlining the assembly process.

Furthermore, the rotational-shaft control strategies of traditional anti-shake systems depend heavily on complex feedback mechanisms, where inner-shaft and outer-shaft control are often executed separately. This separation inherently increases system complexity and may adversely affect real-world synchronization and precision.

Consequently, the related art continues to present numerous unresolved challenges, including but not limited to the need to simplify hardware design, increase transmission accuracy, and optimize control strategies.

SUMMARY

In view of this, the disclosure provides a parallel-driven binocular anti-shake assembly configured to simplify hardware configurations, increase transmission accuracy, streamline control strategies, and achieve more precise anti-shake control. By means of an innovative transmission mechanism, a simplified control scheme, and an optimized bearing assembly method, the disclosure overcomes the limitations of conventional anti-shake technologies and offers broad application prospects, particularly in precision optical instruments.

To achieve the objectives mentioned above, the disclosure provides the following technical solutions:

Based on the above-mentioned objectives, the disclosure provides a parallel-driven binocular anti-shake assembly, including a left prism housing, a right prism housing, a rotation frame, rotating shaft bearings, a bridging connecting rod, an outer frame, side bearings, an integrated circuit board, an inner shaft driving coil, an outer shaft driving coil, an inner shaft Hall element, an outer shaft Hall element, a gyroscopic sensor, an inner shaft driving magnetic steel, an inner shaft sensing magnetic steel, and an outer shaft magnetic steel. The left prism housing and the right prism housing are arranged symmetrically, and respectively mounted within the rotation frame via the rotating shaft bearings. Two inverting prisms are respectively disposed in the left prism housing and the right prism housing. Two ends of the connecting rod are respectively connected to the left prism housing and the right prism housing via bearings, and the connecting rod is configured to drive the two prism housings (i.e., the left prism housing and the right prism housing) to rotate synchronously about respective rotating shafts to realize azimuth-axis motions. A left-side wall and a right-side wall of the rotation frame are hinged to the outer frame through the side bearings to realize pitch-axis rotations. The integrated circuit board is fixedly mounted on the rotation frame, and the circuit board integrates the inner shaft driving coil, the outer shaft driving coil, the inner shaft Hall element, the outer shaft Hall element, and the gyroscopic sensor. The inner shaft driving magnetic steel is disposed on a middle portion of the connecting rod, and corresponding to the inner shaft driving coil on the circuit board. The inner shaft sensing magnetic steel is disposed on a sidewall of either the left prism housing or the right prism housing, and corresponding to the inner shaft Hall element. The outer shaft magnetic steel is disposed on the outer frame, and corresponding to the outer shaft driving coil and the outer shaft Hall element.

In an embodiment, the rotating shaft bearings of the left prism housing and the right prism housing adopt an up-down double arrangement to eliminate front-back swinging errors of the prism housing, and the bearings at the two ends of the connecting rod adopt a left-right arrangement to reduce azimuth-axis rotation radius.

In an embodiment, the inner shaft sensing magnetic steel is disposed on only one of the left prism housing and the right prism housing, and the inner shaft sensing magnetic steel is configured to transmit motions to another one of the left prism housing and the right prism housing through the connecting rod to achieve synchronous angle detection of both prisms.

In an embodiment, an azimuth-axis and a pitch-axis of the binocular anti-shake assembly respectively adopt individual-axis control strategies, the azimuth-axis uses a feedforward-feedback composite control and the pitch-axis uses a differential-feedback tracking control.

In an embodiment, articulated bearings between the rotation frame and the outer frame are configured as a mid-shaft inserting structure.

In an embodiment, the binocular anti-shake assembly is disposed within an optical path between an objective lens and an eyepiece of a binocular telescope; and the binocular telescope further includes a focusing assembly and focusing lens the focusing assembly is connected to the focusing lens, and the binocular telescope is provided with a switch, the switch is configured to control power supply of the circuit board and control locking and releasing of the left prism housing, the right prism housing and the rotation frame.

In an embodiment, the binocular anti-shake assembly includes the following individual-axis control strategies:

azimuth-axis control, including:

detecting, by using the gyroscopic sensor, an azimuth-axis angular velocity to generate a displacement target quantity through a feedforward calculation; and detecting, by using the inner shaft Hall element, an angle of one of the left prism housing and the right prism housing disposed with the inner shaft Hall sensing magnetic steel as an azimuth-axis feedback quantity of the azimuth-axis to drive the inner shaft driving coil through a closed-loop control algorithm; and pitch-axis control, including:

detecting, by using the outer shaft Hall element, an angle of the rotation frame to generate an angular-velocity target quantity through a differential calculation; and detecting, by using the gyroscopic sensor, a pitch-axis angular velocity as a pitch-axis feedback quantity of the pitch-axis to drive the outer shaft driving coil through a tracking control algorithm.

In an embodiment, the feedforward calculation of the azimuth-axis employs an angular-velocity integration algorithm to convert an output of the gyroscopic sensor into a displacement compensation quantity.

The differential calculation of the pitch-axis employs an angular-difference algorithm to convert an output of the outer shaft Hall-element into an angular-velocity command.

In an embodiment, data of the gyroscopic sensor is used for the feedforward calculation of the azimuth-axis and the tracking control algorithm of pitch-axis to achieve single-sensor multiplexing.

In an embodiment, a groove is defined on the middle portion of the connecting rod, the inner shaft driving magnetic steel is set in the groove.

Compared to the related art, the parallel-driven binocular anti-shake assembly provided by the disclosure has advantageous effects as follows.

1. The disclosure uses a parallel connecting rod mechanism to achieve precise synchronous motions of the left and right prisms. The structure eliminates the angle distortion caused by the prism bearing clearance in the traditional anti-shake systems and avoids inconsistent field-of-view of binocular images, thereby greatly improving synchronism and ensuring consistent image stability of the binocular telescope at different angles. The synchronous accuracy of the two prisms is also substantially increased.

2. The disclosure adopts the individual-axis control strategies in which the azimuth-axis and the pitch-axis are controlled independently. The azimuth-axis achieves precise angle compensation through the feedforward-feedback composite control algorithms. The pitch-axis achieves accurate tracking through the differential-feedback control methods. Such decoupled control significantly reduces mutual interference and errors between the two axis controls, making the anti-shake effects more stable and responsive. Through decoupled control of the azimuth-axis and the pitch-axis, errors caused by control coupling can be reduced.

3. Through the design of the bearings of the prism housings (i.e., the left prism housing 1 and the right prism housing) which adopt the up-down double arrangement and the bearings of the connecting rod which adopt the left-right arrangement, the angle distortion caused by bearing clearance, mechanical transmission errors and eccentricity issues is effectively reduced. Such a design not only improves transmission accuracy of the assembly, but also eliminates swinging errors of prisms in the traditional designs, and ensures stability of anti-shake effects. By fixing the sensing magnetic steel on the prism housing and disposing the driving magnetic steel in the connecting rod, the detection errors caused by the bearing clearance of the connecting rod can be effectively avoided. The relative positions of the Hall elements and the driving coils are optimized, enabling the sensing system to provide real-time and precise feedback on angle information, thereby improving response speed and stability of the anti-shake system.

4. By integrating all the sensors, the driving coils, the control chips, and other components on the single circuit board, not only the wiring complexity is reduced, but the risks of cable interference and loosening in the traditional designs are also eliminated, improving the system reliability. The integrated design of the circuit board reduces the connections between multiple circuit boards and further enhances product compactness and anti-shake effects. Since the feedforward-feedback composite control strategy and the differential control strategy are adopted, the disclosure exhibits excellent dynamic response performance in dual-axis control. Especially under high-speed motions or sharp environmental changes, the system can rapidly capture angular changes and perform precise compensation, thereby avoiding image distortion or instability caused by response delay in the traditional anti-shake systems.

5. The disclosure adopts a highly integrated design that reduces the use of a large number of discrete components in the traditional anti-shake systems. Through optimizing magnetic steel layout and simplifying wiring structure, the hardware cost can be reduced by approximately 30%. Due to the modularization of the system components and the integration of the circuits, assembly efficiency can be improved by approximately 50%, so that the production process becomes simpler and more operable. The setting method of the up-down double arrangement of the prism housings (i.e., the left prism housing and the right prism housing) and the side placement of the sensing magnetic steel eliminates front-back swinging errors caused by the bearing clearance of the connecting rod, thereby improving the accuracy of the azimuth-axis angle detection. Disposing the sensing magnetic steel on only a single prism housing, and transmission of the motions through the rigid connecting rod avoid dual sensor calibration errors and reduce angle synchronism deviations. The integration of the gyroscopic sensor, the driving coils and the Hall elements on a single circuit board removes fixed cable between the gyroscope and the prisms in the traditional schemes, so that the circuit interfaces can be reduced and the failure rate can be decreased. The mid-shaft inserting bearing replaces the screw locking structure, reducing the coaxiality errors of the bearings and improving the assembly efficiency.

6. The left-right bearing arrangement of the connecting rod reduces a rotation radius of the azimuth-axis and decreases axial space occupation of the assembly, so that the assembly is applicable to compact binocular devices. Adopting the feedforward-feedback composite control, Hall angle differentiation generates target angular velocity to avoid zero drift of the gyroscopic sensor, and the gyroscopic sensor feedbacks to real-time correct frame vibration, thereby improving anti-interference performance. The gyroscope data is synchronously used for the azimuth-axis feedforward and the pitch-axis feedback, which can reduce hardware cost of one gyroscopic sensor and decrease the power consumption. The two prisms are constrained by the connecting rod to deflect absolutely synchronously, so that the field-of-view translation errors can be reduced and the binocular field misalignment can be completely eliminated. The mid-shaft inserting bearing improves the vibration tolerance, so that no performance degradation will occur under the random vibration from 5 hertz (Hz) to 500 Hz. The binocular anti-shake assembly provided by the disclosure is not only applicable to the binocular telescopes, but can also be widely applied to various optical instruments such as unmanned aerial vehicles and video cameras. The high stability and high-precision anti-shake effects can maintain good operating performance under various harsh environments and thereby significantly improves reliability and service life of the devices.

These and other aspects of the disclosure will become more readily apparent and understood from the description of the embodiments provided below. It is to be understood that the foregoing general description and the following detailed description are exemplary and explanatory only and are not intended to limit the present application.

BRIEF DESCRIPTION OF DRAWINGS

To more clearly illustrate the technical solutions of the embodiments of the disclosure or of the related art, the accompanying drawings used in the description of the exemplary embodiments or in the related technical descriptions are briefly introduced below. The drawings serve to provide a further understanding of the disclosure, form part of the specification, and are used together with the embodiments of the disclosure to explain the disclosure and do not constitute a limitation on the disclosure.

DESCRIPTION OF REFERENCE SIGNS

Figure 1:
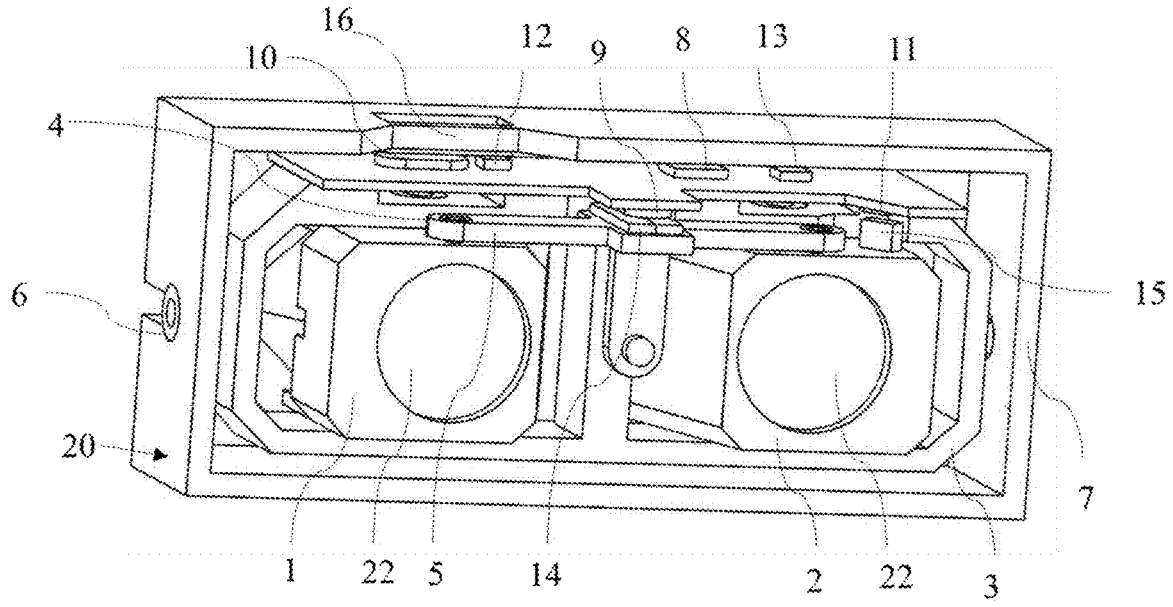
FIG. 1 illustrates a schematic structural view of a parallel-driven binocular anti-shake assembly according to the disclosure.
Figure 2:
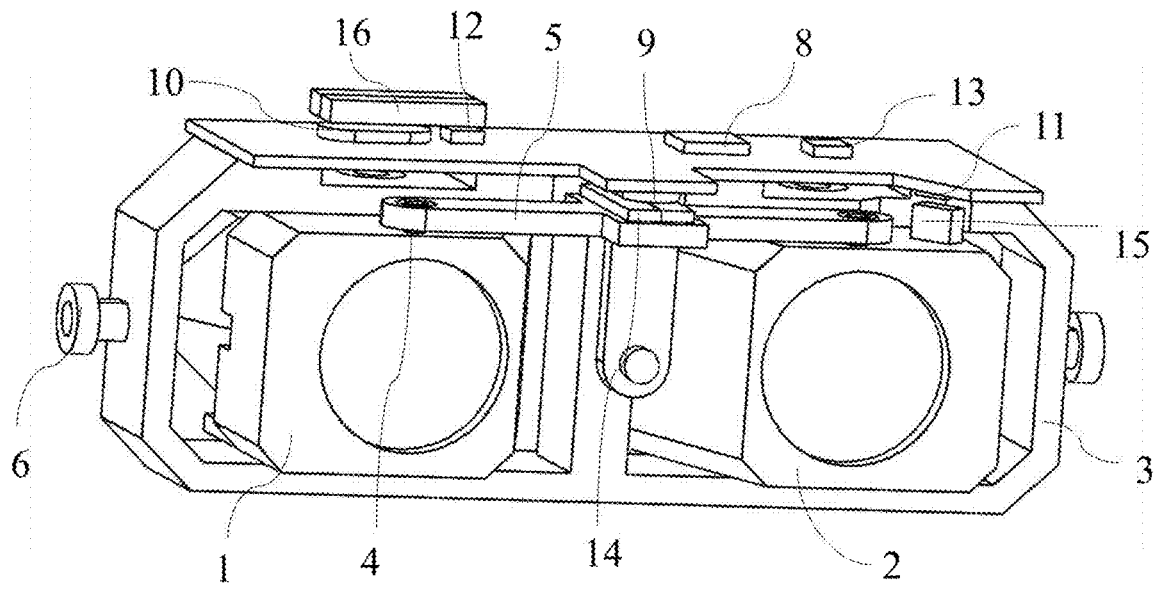
FIG. 2 illustrates a schematic structural view of an internal structure of a rotation frame of the parallel-driven binocular anti-shake assembly according to the disclosure.
Figure 3:
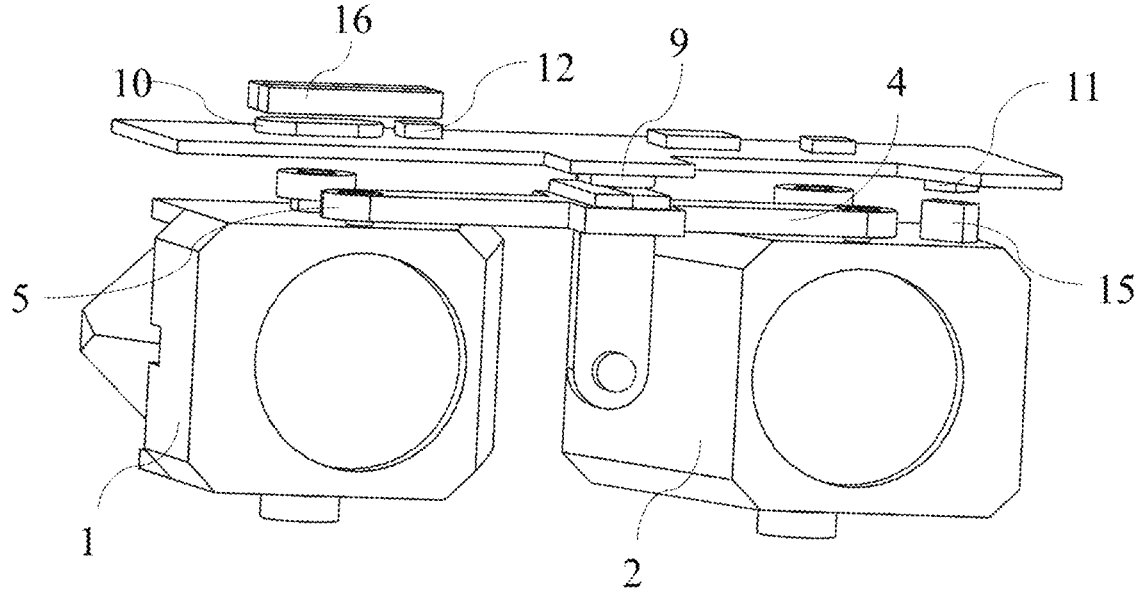
FIG. 3 illustrates a schematic structural view of a left prism housing and a right prism housing connected by a connecting rod inside the rotation frame of the parallel-driven binocular anti-shake assembly according to the disclosure.
Figure 4:
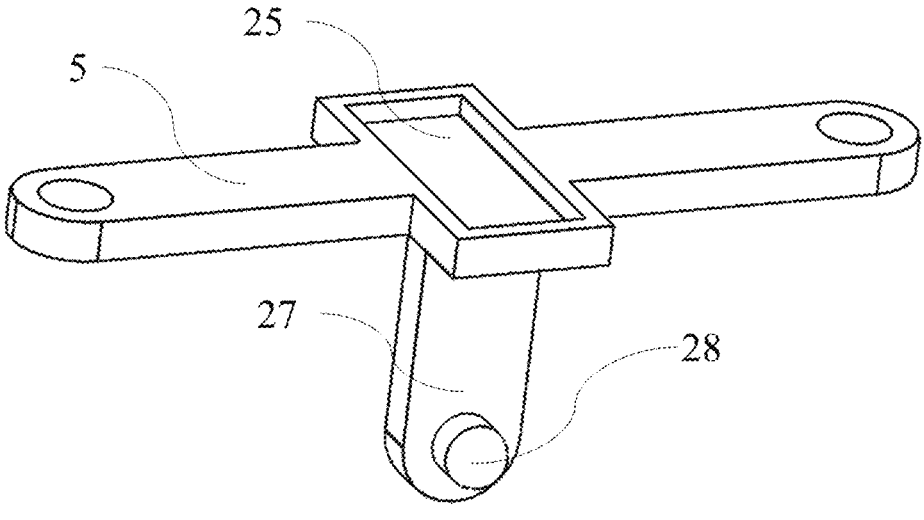
FIG. 4 illustrates a schematic structural view of the connecting rod of the parallel-driven binocular anti-shake assembly according to the disclosure.
Figure 5:
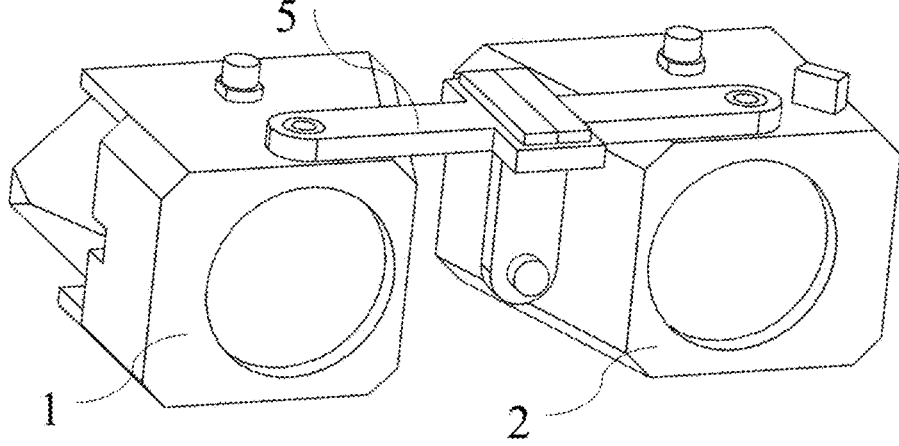
FIG. 5 illustrates a schematic structural view of the connecting rod connecting the left prism housing and the right prism housing of the parallel-driven binocular anti-shake assembly according to the disclosure.
Figure 6:
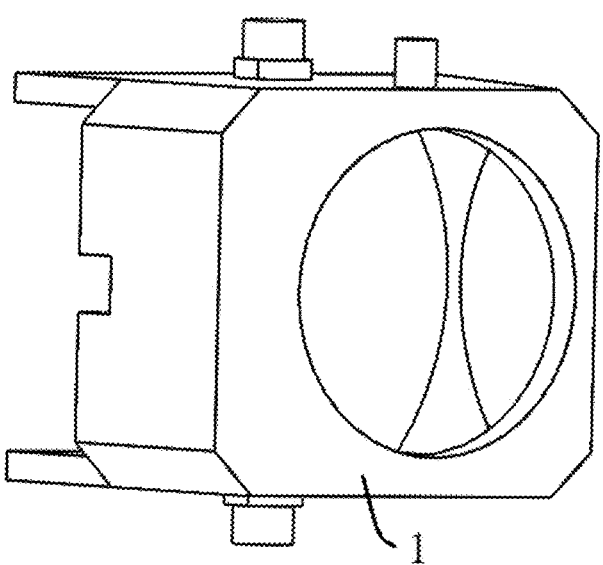
FIG. 6 illustrates a schematic structural view of the left prism housing of the parallel-driven binocular anti-shake assembly according to the disclosure.
Figure 7:
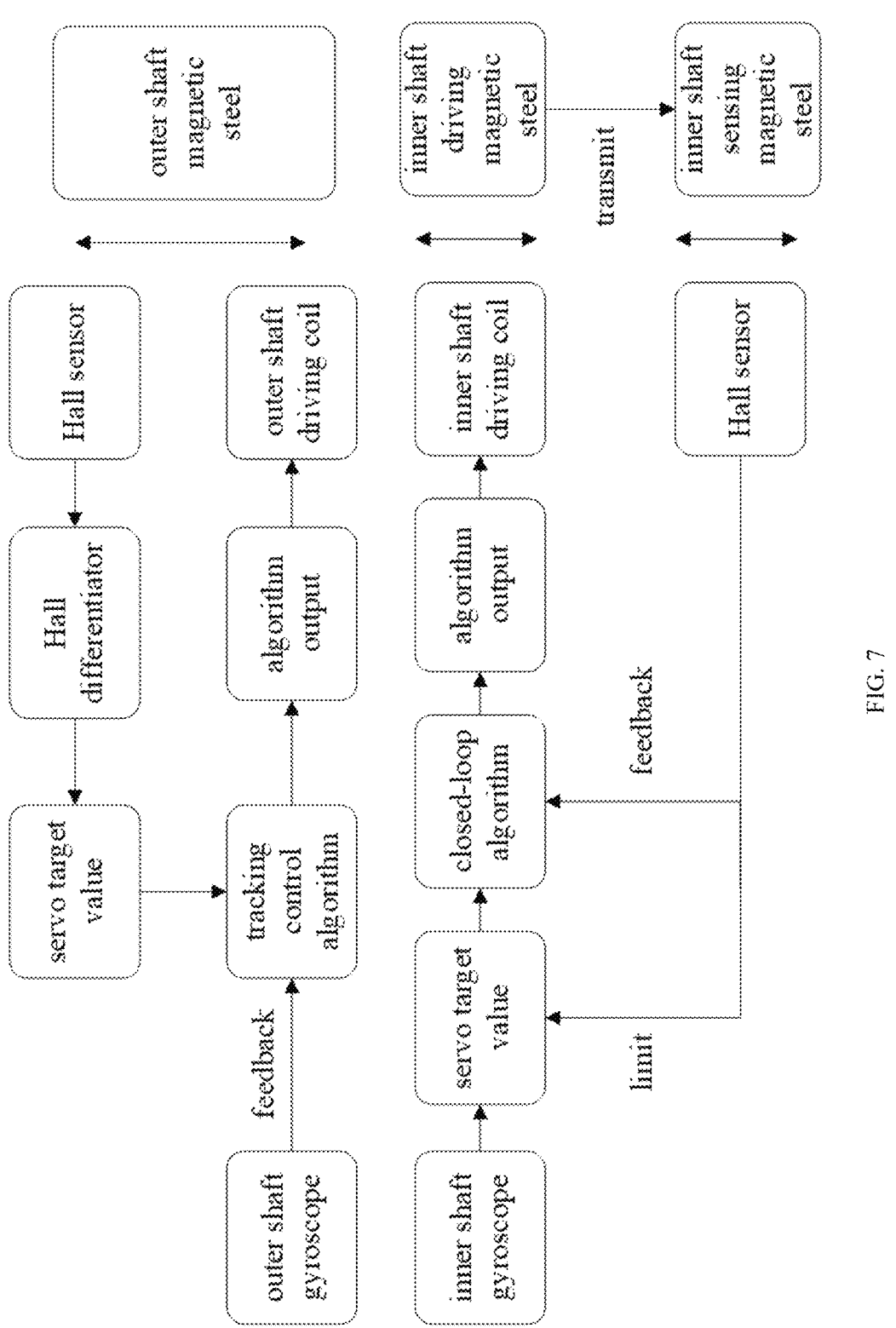
FIG. 7 illustrates a flowchart of individual-axis control strategies of the parallel-driven binocular anti-shake assembly according to the disclosure.

1—left prism housing; 2—right prism housing; 3—rotation frame; 4—rotating shaft bearing; 5—connecting rod; 6—side bearing; 7—outer frame; 8—circuit board; 9—inner shaft driving coil; 10—outer shaft driving coil; 11—inner shaft Hall element; 12—outer shaft Hall element; 13—gyroscopic sensor; 14—inner shaft driving magnetic steel; 15—inner shaft sensing magnetic steel; 16—outer shaft magnetic steel; 17—objective lens; 18—focusing assembly; 19—focusing lens; 20—binocular anti-shake assembly; 21—switch; 22—inverting prism; 23—eyepiece; 24—binocular telescope; 25—groove; 26—locking mechanism; 27—locking rod; 28—protrusion.

DETAILED DESCRIPTION OF EMBODIMENTS

Hereinafter, the disclosure is further described in conjunction with the accompanying drawings and specific embodiments. It is to be noted that, in the absence of conflict, the embodiments described below or the technical features thereof may be combined in any manner to form new embodiments.

To render the objectives, technical solutions, and advantages of the disclosure clearer, the embodiments of the disclosure are further described in detail below with reference to the accompanying drawings and in conjunction with specific embodiments. It should be understood that the specific embodiments described herein are provided solely for purposes of illustration and are not intended to limit the disclosure.

It should be noted that, in the embodiments of the disclosure, all references to "first" and "second" are used solely to distinguish between two entities or parameters that bear the same name but are not identical. Thus, "first" and "second" are employed merely for convenience of description and should not be construed as limiting the embodiments of the disclosure. In addition, the terms "comprise," "include," and any variations thereof are intended to cover non-exclusive inclusion, such that a process, method, system, product, or other inherent steps or units of the device inherent.

Hereinafter, the technical solutions of the embodiments of the disclosure are described clearly and completely in conjunction with the drawings provided in the embodiments of the disclosure. It will be apparent that the described embodiments constitute only a portion of the embodiments of the disclosure, rather than all embodiments. All other embodiments obtained by those skilled in the art based on the embodiments of the disclosure without making inventive efforts fall within the scope of protection of the disclosure.

The flowcharts shown in the accompanying drawings are provided by way of illustration only and are not required to include all contents or operations/steps, nor are they required to be performed in the exact order described. For example, certain operations/steps may be further broken down, combined, or partially merged, and the actual order of execution may therefore vary according to practical circumstances.

The following provides a detailed description of some implementation methods of this application in combination with the attached drawings. In the absence of conflict, the following embodiments and the features therein can be combined with each other.

The disclosure provides a parallel-driven binocular anti-shake assembly 20, which not only enables flexible switching between two sensors but also intelligently perceives changes in a working environment (such as materials and colors of a desktop) and changes in configuration settings (such as level of detail (LOD) settings). Through a dynamic data compensation algorithm, the parallel-driven binocular anti-shake assembly 20 eliminates the influence of these changes on cursor motion trajectories and ensures that a user obtains a highly consistent and predictable operating feel.

As illustrated in FIG. 1 to FIG. 6, an embodiment of the disclosure provides a parallel-driven binocular anti-shake assembly 20 that includes a left prism housing 1, a right prism housing 2, a bridging connecting rod 5, a rotating frame 3, an integrated circuit board 8, an inner shaft driving magnetic steel 14, an inner shaft sensing magnetic steel 15 and an outer shaft magnetic steel 16.

The left prism housing 1 and the right prism housing 2 which are arranged symmetrically and are respectively mounted within a rotation frame 3 via a rotating shaft bearing 4. Two inverting prisms 22 are respectively disposed in the left prism housing 1 and the right prism housing 2.

The bridging connecting rod 5, with its two ends connected to the left prism housing 1 and the right prism housing 2 via bearings, enabling the connecting rod 5 to be configured to drive the left prism housing 1 and the right prism housing 2 to rotate synchronously about respective rotating shafts to perform azimuth-axis motions.

The rotation frame 3 is configured such that its left-side wall and right-side wall are hinged to an outer frame 7 via side bearings 6, enabling pitch-axis rotations.

The integrated circuit board 8 is fixedly mounted on the rotation frame 3. An inner shaft driving coil 9, an outer shaft driving coil 10, an inner shaft Hall element 11, an outer shaft Hall element 12 and a gyroscopic sensor 13 are integrated on the circuit board 8.

The inner shaft driving magnetic steel 14 is disposed at a middle portion of the connecting rod 5. The inner shaft driving magnetic steel 14 is corresponding to the inner shaft driving coil 9 on the circuit board 8.

The inner shaft sensing magnetic steel 15 is disposed on a side wall of either the left prism housing 1 or the right prism housing 2. The inner shaft sensing magnetic steel 15 is corresponding to the inner shaft Hall element 11.

The outer shaft magnetic steel 16 is disposed on the outer frame 7. The outer shaft magnetic steel 16 is corresponding to the outer shaft driving coil 10 and the outer shaft Hall element 12.

In the disclosure, the left prism housing 1 and the right prism housing 2 perform the azimuth-axis rotations through push-and-pull actions of the connecting rod 5, the rotation radius is small, the optical performance is good and the structure is simple and reliable. The inner shaft driving coil 9, the outer shaft driving coil 10, the inner shaft Hall element 11, the outer shaft Hall element 12 and the gyroscopic sensor 13 are integrated on the main control circuit board 8 that is fixedly connected to the rotation frame 3. The inner rotation shaft uses gyroscope data to feedforward servo, and the outer rotation shaft uses the gyroscope data to feedback control to realize driving and anti-shake controlling for the two shafts, so that the sensor configurations can be simplified and connections between multiple circuit boards can be avoided, and the hardware can be simplified and the reliability can be high. The rotation structure adopts an internal central shaft and external sleeve shaft manner, which improves transmission accuracy and reduces assembly complexity compared with screw-fixation methods in the related art. By integrating all the sensors, the driving coils, the control chips, and other components on the single circuit board 8, not only is the wiring complexity reduced, but the risks of cable interference and loosening in the traditional designs are also eliminated, improving the system reliability. The integrated design of the circuit board 8 reduces the connections between multiple circuit boards 8 and further enhances product compactness and anti-shake effects. Since a feedforward-feedback composite control strategy and a differential control strategy are adopted, the disclosure exhibits excellent dynamic response performance in dual-axis control. Especially under high-speed motions or sharp environmental changes, the system can rapidly capture angular changes and perform precise compensation, thereby avoiding image distortion or instability caused by response delay in the traditional anti-shake systems.

In an embodiment, the rotation shaft bearings 4 of the left prism housing 1 and the right prism housing 2 adopt an up-down double arrangement to eliminate front-back swinging errors of the prism housings (i.e., the left prism housing 1 and the right prism housing 2). The bearings at the two ends of the connecting rod 5 adopt a left-right arrangement to reduce the azimuth-axis rotation radius. The articulated bearings between the rotation frame 3 and the outer frame 7 are configured as a mid-shaft inserting structure, replacing screw locking fixation. Through the design of bearings of the prism housings which adopt the up-down double arrangement and bearings of the connecting rod 5 which adopt the left-right arrangement, the angle distortion caused by bearing clearance, mechanical transmission errors and eccentricity issues is effectively reduced. Such a design not only improves transmission accuracy of the assembly, but also eliminates swinging errors of prisms in the traditional designs, and ensures stability of anti-shake effects. By fixing the sensing magnetic steel on the prism housing and disposing the driving magnetic steel in the connecting rod 5, the detection errors caused by the bearing clearance of the connecting rod 5 can be effectively avoided. The relative positions of the Hall elements and the driving coils are optimized, enabling the sensing system to provide real-time and precise feedback on angle information, thereby improving response speed and stability of the anti-shake system.

In an embodiment, the inner shaft sensing magnetic steel 15 is disposed only on one of the left prism housing 1 and the right prism housing 2, and the motions of one of the left prism housing 1 and the right prism housing 2 can be transmitted to another one of the left prism housing 1 and the right prism housing 2 through the synchronous connecting rod 5, so that synchronous angle detection of both prisms can be realized. The disclosure uses a parallel connecting rod mechanism to achieve precise synchronous motions of the left and right prisms. The structure eliminates the angle distortion caused by the prism bearing clearance in the traditional anti-shake systems and avoids inconsistent field-of-view of binocular images, thereby greatly improving synchronism and ensuring consistent image stability of the binocular telescope at different angles. The synchronous accuracy of the two prisms is also substantially increased.

In an embodiment, an azimuth-axis and a pitch-axis of the binocular anti-shake assembly 20 respectively adopt individual axis control strategies. The azimuth-axis uses a feedforward-feedback composite control and the pitch-axis uses a differential-feedback tracking control. The disclosure adopts individual axis control strategies in which the azimuth-axis and the pitch-axis are controlled independently. The azimuth-axis achieves precise angle compensation through the feedforward-feedback composite control algorithms. The pitch-axis achieves accurate tracking through the differential-feedback control methods. Such decoupled control significantly reduces mutual interference and errors between the two axis controls, making the anti-shake effects more stable and responsive. Through decoupled control of the azimuth-axis and the pitch-axis, errors caused by control coupling can be reduced.

Figure 8:
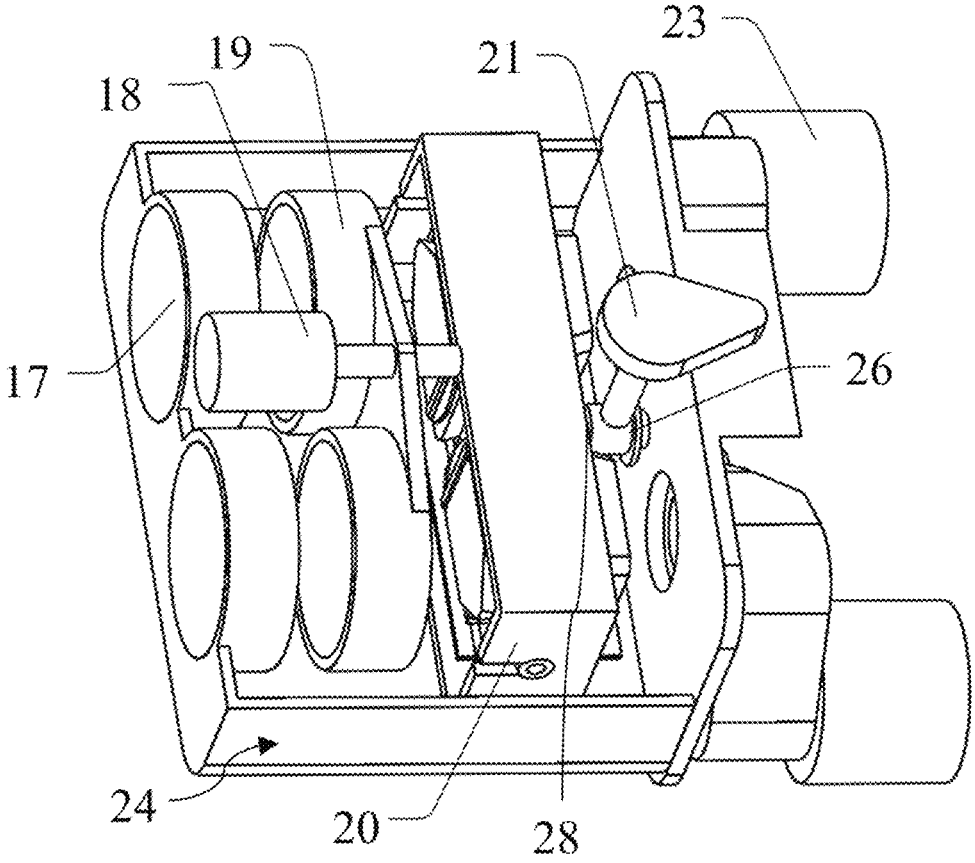
FIG. 8 illustrates a schematic structural view of an internal structure of the binocular telescope according to the disclosure

In an embodiment, as illustrated in FIG. 8, the binocular anti-shake assembly 20 is disposed within an optical path between an objective lens and an eyepiece of a binocular telescope. The binocular telescope further includes a focusing assembly and focusing lens 19, the focusing assembly 18 is connected to the focusing lens 19, and the binocular telescope 24 is provided with a switch 21, the switch 21 is configured to control power supply of the circuit board 8 and control locking and releasing of the left prism housing 1, the right prism housing 2 and the rotation frame 3. A locking rod 27 is connected to a middle part of the connecting rod 5, a protrusion 28 is formed on the locking rod 27. The binocular telescope 24 includes a locking mechanism 26 connected to the switch 21. The switch 21 is configured to control the extension and the retraction of the locking mechanism 26.

When the locking mechanism 26 is extended, the locking mechanism 26 compresses the protrusion 28 to lock the rotation of the left prism housing 1, the right prism housing 2 and the rotation frame 3. When the locking mechanism 26 is retracted, the locking mechanism 26 release the protrusion 28 so that the left prism housing 1, the right prism housing 2 and the rotation frame 3 are available to rotate.

In an embodiment, as illustrated in FIG. 1 to FIG. 7, the binocular anti-shake assembly 20 implements the individual axis control strategies, and the individual axis control strategies include azimuth-axis control and pitch-axis control.

The azimuth-axis control includes the following steps.

An azimuth-axis angular velocity is detected by using the gyroscopic sensor 13 to generate a displacement target quantity through a feedforward calculation.

An angle of the prism housing disposed with the inner shaft sensing magnetic steel 15 is detected by using the inner shaft Hall element 11 and is used as an azimuth-axis feedback quantity of the azimuth-axis to drive the inner shaft driving coil 9 through a closed-loop control algorithm.

The pitch-axis control includes the following steps.

An angle of the rotation frame 3 is detected by using the outer shaft Hall element 12 to generate an angular-velocity target quantity through a differential calculation.

A pitch-axis angular velocity is detected by using the gyroscopic sensor 13 and is used as a pitch-axis feedback quantity of the pitch-axis to drive the outer shaft driving coil 10 through a tracking control algorithm.

In an embodiment, the feedforward calculation of the azimuth-axis uses an angular velocity integration algorithm to convert an output of the gyroscopic sensor into a displacement compensation quantity. In an embodiment, for the azimuth-axis, the two prism housings (i.e., the left prism housing 1 and the right prism housing 2) are in an inner side of the azimuth-axis, the rotation frame 3 (the gyroscopic sensor 13 is located in the outer side of the azimuth-axis) is in an outer side of the azimuth-axis. Therefore, the gyroscopic sensor 13 obtains angular velocity of motion of the outer side of the azimuth-axis, and the data obtained by the gyroscopic sensor 13 cannot be used directly as the feedback quantity of the closed-loop control.

The angular velocity data GyroZ of the motion of the outer side of the azimuth-axis is obtained by the gyroscopic sensor 13 to perform the feedforward calculation. The product of the GyroZ and a scaling factor ScaleZ is accumulated (i.e., integrating the product) to obtain a target control quantity HallAimZ of the inner shaft Hall element 11, in other words: HallAimZ=HallAimZ+GyroZ×ScaleZ. Considering that the rotational angle of the azimuth-axis is limited, a centering operation is needed to achieve angle tracking. To avoid reaching mechanical limits, the following algorithm is employed to achieve centering and thereby obtain the actual target control quantity HallAimZ of the inner shaft Hall element 11. ScaleZero denotes a centering scale factor.

$$HallAimZ=HallAimZ-ScaleZero×HallAimZ.$$

The HallAimZ is used as the target control quantity of the inner shaft Hall element 11, and an obtained value HallZ of the inner shaft Hall element 11 is used as the feedback quantity to perform the closed-loop control algorithm (also referred to a feedback control algorithm, such as proportion integration differentiation (PID) or active disturbance rejection control algorithm). The inner shaft driving coil 9 is provided with an output quantity of the closed-loop control algorithm to achieve precise tracking, thereby achieving the anti-shake effects of the azimuth-axis.

In an embodiment, for the pitch-axis, the rotation frame 3 is in an inner side of the pitch-axis, the outer frame 7 is in an outer side of the pitch-axis. Therefore, the gyroscopic sensor 13 obtains angular velocity of motion of the inner side of the pitch-axis; the data obtained by the gyroscopic sensor 13 can be used as the feedback quantity of the closed-loop control.

An output quantity HallX of the outer shaft Hall element 12 represents a rotational angle of the pitch-axis. Rotational velocity corresponding to the pitch-axis HallDiffX is obtained by applying the differential algorithm to the HallX. The specific is shown below.

$$HallDiffX=Diff(HallX).$$

The Hall differential quantity HallDiffX of the pitch-axis is multiplied by a scaling factor ScaleX to obtain the angular velocity control target quantity GyroAimX.

$$GyroAimX=HallDiffX×ScaleX.$$

The GyroAimX is used as the target control quantity of the outer shaft Hall element 12, and a value GyroX obtained by the gyroscopic sensor 13 is used as the feedback quantity to perform the closed-loop control algorithm. The outer shaft driving coil 10 is provided with an output quantity of the closed-loop control algorithm to achieve precise tracking, thereby achieving the anti-shake effects of the pitch-axis.

The differential calculation of the pitch-axis uses an angular difference algorithm to convert the output of the Hall element into an angular velocity command.

In an embodiment, data of the gyroscopic sensor 13 is used for both the azimuth-axis feedforward and the pitch-axis feedback to achieve single sensor multiplexing.

In an embodiment, a groove 17 is defined on the middle portion of the connecting rod 5, the inner shaft driving magnetic steel 14 is set in the groove 17.

The disclosure adopts a highly integrated design that reduces the use of a large number of discrete components in the traditional anti-shake systems. Through optimizing magnetic steel layout and simplifying wiring structure, the hardware cost can be reduced by approximately 30%. Due to the modularization of the system components and the integration of the circuits assembly, efficiency can be improved by approximately 50%, so that the production process becomes simpler and more operable. The setting method of the up-down double arrangement of the prism housings and (i.e., the left prism housing 1 and the right prism housing 2) the side placement of the sensing magnetic steel eliminates front-back swinging errors caused by the bearing clearance of the connecting rod 5, thereby improving the accuracy of the azimuth-axis angle detection. Disposing the sensing magnetic steel on only a single prism housing, and transmission of the motions through the rigid connecting rod 5 avoid dual sensor calibration errors and reduce angle synchronism deviations. The integration of the gyroscopic sensor, the driving coils and the Hall elements on a single circuit board 8 eliminates fixed cable between the gyroscope and the prisms in the traditional schemes, so that the circuit interfaces can be reduced and the failure rate can be decreased. The mid-shaft inserting bearing replaces the screw locking structure, reducing the coaxiality errors of the bearings and improving the assembly efficiency.

The left-right bearing arrangement of the connecting rod 5 reduces the azimuth-axis rotation radius and decreases axial space occupation of the assembly so that the assembly is applicable to compact binocular devices. Adopting the feedforward-feedback composite control, Hall angle differentiation generates target angular velocity to avoid zero drift of the gyroscopic sensor 13, and the gyroscopic sensor 13 feedback real-time correction of frame vibration improves anti-interference performance. Synchronous use of gyroscopic sensor 13 data for the azimuth-axis feedforward and the pitch-axis feedback can reduce hardware cost of one gyroscope and decrease the power consumption. The two prisms are constrained by the connecting rod 5 to deflect absolutely synchronously so that the field-of-view translation errors can be reduced and the binocular field misalignment can be completely eliminated. The mid-shaft inserting bearing improves the vibration tolerance so that no performance degradation will occur under the random vibration from 5 Hz to 500 Hz. The binocular anti-shake assembly 20 provided by the disclosure is not only applicable to the binocular telescopes, but can also be widely applied to various optical instruments such as unmanned aerial vehicles and video cameras. The high stability and high-precision anti-shake effects can maintain good operating performance under various harsh environments and thereby significantly improves reliability and service life of the devices.

The embodiments described above are exemplary embodiments disclosed by the disclosure. It should be noted, however, that many variations and modifications may be made without departing from the scope defined by the claims that the embodiments of the disclosure disclosed. The functions, steps, and/or acts recited in the method claims of the disclosed embodiments need not be performed in any particular order. Furthermore, although elements of the disclosed embodiments may be described or claimed in individual form, they can also be understood as multiple unless explicitly restricted to the singular.

It should be understood that, the singular forms "a" and "an" used in the disclosure are intended to include the plural forms as well, unless the context clearly support exceptions. It should also be understood that the term "and/or" as used herein includes any and all combinations of one or more of the associated listed items in the above. The sequence numbers assigned to the disclosed embodiments are for description only and do not indicate relative superiority or inferiority of the embodiments.

Those skilled in the related art should understand that any discussion of the above embodiments is merely exemplary and is not intended to imply that the scope of the disclosure (including the claims) is limited to these examples. Under the inventive concept of the disclosure, the technical features in the above embodiments or in different embodiments may also be combined, and many other variations in the different aspects of the disclosed embodiments exist. For brevity, these variations are not provided in detail. Therefore, any omission, modification, equivalent substitution, or improvement made within the spirit and principle of the disclosure shall be included within the scope of protection of the embodiments of the disclosure.

What is claimed is:

1. A parallel-driven binocular anti-shake assembly (20), comprising:
   a left prism housing (1) and a right prism housing (2) arranged symmetrically, and respectively mounted within a rotation frame (3) via rotating shaft bearings (4), two inverting prisms (22) are respectively disposed in the left prism housing (1) and the right prism housing (2);
   a bridging connecting rod (5), wherein two ends of the connecting rod (5) are respectively connected to the left prism housing (1) and the right prism housing (2) via rotating shaft bearings (4), and the connecting rod (5)

is configured to drive the left prism housing (1) and the right prism housing (2) to rotate synchronously about respective axes to perform azimuth-axis motions;
   the rotation frame (3), wherein a left-side wall and a right-side wall of the rotation frame (3) are hinged to an outer frame (7) through side bearings (6) to perform pitch-axis rotations;
   an integrated circuit board (8), fixedly mounted on the rotation frame (3), wherein the circuit board (8) integrates an inner shaft driving coil (9), an outer shaft driving coil (10), an inner shaft Hall element (11), an outer shaft Hall element (12), and a gyroscopic sensor (13);
   an inner shaft driving magnetic steel (14), disposed on a middle portion of the connecting rod (5), and corresponding to the inner shaft driving coil (9) on the circuit board (8);
   an inner shaft sensing magnetic steel (15), disposed on a sidewall of either the left prism housing (1) or the right prism housing (2), and corresponding to the inner shaft Hall element (11); and
   an outer shaft magnetic steel (16), disposed on the outer frame (7), and corresponding to the outer shaft driving coil (10) and the outer shaft Hall element (12).

2. The parallel-driven binocular anti-shake assembly (20) as claimed in claim 1, wherein the rotating shaft bearings (4) of the left prism housing (1) and the right prism housing (2) adopt an up-down double arrangement, and the bearings at the two ends of the connecting rod (5) adopt a left-right arrangement.

3. The parallel-driven binocular anti-shake assembly (20) as claimed in claim 2, wherein the inner shaft sensing magnetic steel (15) is disposed on only one of the left prism housing (1) and the right prism housing (2), and the inner shaft sensing magnetic steel (15) is configured to transmit motions to another one of the left prism housing (1) and the right prism housing (2) through the connecting rod (5) to achieve synchronous angle detection of both prisms.

4. The parallel-driven binocular anti-shake assembly (20) as claimed in claim 3, wherein an azimuth-axis and a pitch-axis of the binocular anti-shake assembly (20) respectively adopt individual-axis control strategies, the azimuth-axis uses a feedforward-feedback composite control, and the pitch-axis uses a differential-feedback tracking control.

5. The parallel-driven binocular anti-shake assembly (20) as claimed in claim 4, wherein the binocular anti-shake assembly (20) comprises the following individual-axis control strategies:
   azimuth-axis control, comprising:
      detecting, by using the gyroscopic sensor (13), an azimuth-axis angular velocity to generate a displacement target quantity through a feedforward calculation; and
      detecting, by using the inner shaft Hall element (11), an angle of one of the left prism housing (1) and the right prism housing (2) disposed with the inner shaft sensing magnetic steel (15) as a azimuth-axis feedback quantity of the azimuth-axis to drive the inner shaft driving coil (9) through a closed-loop control algorithm; and
   pitch-axis control, comprising:
      detecting, by using the outer shaft Hall element (12), an angle of the rotation frame (3) to generate an angular-velocity target quantity through a differential calculation; and
      detecting, by using the gyroscopic sensor (13), a pitch-axis angular velocity as a pitch-axis feedback quantity of the pitch-axis to drive the outer shaft driving coil (10) through a tracking control algorithm.

6. The parallel-driven binocular anti-shake assembly (20) as claimed in claim 5, wherein the feedforward calculation of the azimuth-axis employs an angular-velocity integration algorithm to convert an output of the gyroscopic sensor (13) into a displacement compensation quantity; and the differential calculation of the pitch-axis employs an angular-difference algorithm to convert an output of the outer shaft Hall-element (12) into an angular-velocity command.

7. The parallel-driven binocular anti-shake assembly (20) as claimed in claim 6, wherein A data of the gyroscopic sensor (13) is used for the feedforward calculation of the azimuth-axis and the tracking control algorithm of the pitch-axis to achieve single-sensor multiplexing.

8. The parallel-driven binocular anti-shake assembly (20) as claimed in claim 1, wherein the side bearings (6) between the rotation frame (3) and the outer frame (7) are configured as a mid-shaft inserting structure.

9. The parallel-driven binocular anti-shake assembly (20) as claimed in claim 1, wherein the binocular anti-shake assembly (20) is disposed within an optical path between an objective lens (17) and an eyepiece (23) of a binocular telescope (24); and the binocular telescope (24) further comprises a focusing assembly (18) and focusing lens (19), the focusing assembly (18) is connected to the focusing lens (19), and the binocular telescope (24) is provided with a switch (21), the switch (21) is configured to control power supply of the circuit board (8) and control locking and releasing of the left prism housing (1), the right prism housing (2) and the rotation frame (3).

10. The parallel-driven binocular anti-shake assembly (20) as claimed in claim 1, wherein a groove (25) is defined on the middle portion of the connecting rod (5), the inner shaft driving magnetic steel (14) is set in the groove (25).

\* \* \* \* \*